United States Patent [19]
Kamiyama et al.

[11] Patent Number: 5,944,058
[45] Date of Patent: Aug. 31, 1999

[54] BRANCH PIPE LINER ASSEMBLY AND A PIPE LINING METHOD

[75] Inventors: Takao Kamiyama, Hiratsuka; Yasuhiro Yokoshima, Yuki-gun; Shigeru Endoh, Yasato-machi; Hiroyuki Aoki, Tokorozawa, all of Japan

[73] Assignees: Shonan Gosei-jushi Seisakusho K.K., Kanagawa; Yokoshima & Company; GET Inc., both of Ibaraki-ken; OAR Company, Saitama-ken, all of Japan

[21] Appl. No.: 09/017,661

[22] Filed: Feb. 3, 1998

[30] Foreign Application Priority Data

Feb. 4, 1997 [JP] Japan ................................. 9-021513

[51] Int. Cl.$^6$ ..................................................... F16L 55/16
[52] U.S. Cl. .............................. 138/98; 138/97; 264/269; 156/94
[58] Field of Search ........................ 138/97, 98; 264/269; 156/94, 98; 285/15

[56] References Cited

U.S. PATENT DOCUMENTS

| | | | |
|---|---|---|---|
| 4,724,108 | 2/1988 | Jurgenlohmann et al. | 138/98 |
| 4,986,314 | 1/1991 | Himmler | 138/97 |
| 5,040,922 | 8/1991 | Himmler | 138/97 |
| 5,044,824 | 9/1991 | Long, Jr. et al. | 156/287 |
| 5,329,063 | 7/1994 | Endoh | 138/97 |
| 5,340,160 | 8/1994 | Meijers et al. | 285/55 X |
| 5,451,284 | 9/1995 | Ikeda et al. | 138/97 |
| 5,454,401 | 10/1995 | Kamiyama et al. | 138/97 |
| 5,566,719 | 10/1996 | Kamiyama et al. | 138/98 |
| 5,598,873 | 2/1997 | Kamiyama et al. | 138/97 |
| 5,692,543 | 12/1997 | Wood | 138/97 |

*Primary Examiner*—Denise L. Ferensic
*Assistant Examiner*—James F. Hook
*Attorney, Agent, or Firm*—Whitham, Curtis & Whitham

[57] ABSTRACT

A tubular branch pipe liner is proposed, which has a rigid collar at its end and to this collar is attached a protector consisting of a first portion which is out-spread downwardly and curved to fit on the lower face of the collar and is fixed thereto, a second portion which is roughly cylindrical and fitted into the inner peripheral face of the collar and the inner wall of a little part of the tubular branch pipe liner which is immediately continuous from the collar, and a third portion which extends downwardly and terminates in an annular end face at a location substantially lower than the joint where the first portion and the second portion meet; also proposed is a pipe lining method, which comprises the steps of preparing a branch pipe liner with a collar; and attaching the above-mentioned protective member to the collar; and lining a branch pipe with the tubular branch pipe liner; and lining the main pipe with a conventional main pipe liner; and cutting a hole through that circular portion of the main pipe liner which is defined by the annular end face of the third portion of the protective member.

18 Claims, 11 Drawing Sheets

BRANCH PIPE LINER ASSEMBLY AND A PIPE LINING METHOD

BACKGROUND OF THE INVENTION

1. Field of the Invention

The present invention relates to a branch pipe liner with which an aged branch pipe is internally lined, and also to a pipe lining method in which the inventive branch pipe liner and a main pipe liner are used.

2. Description of the Prior Art

When an underground main pipe, such as sewer pipes, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe repair comprises inserting a sufficiently long tubular flexible liner bag into the pipe to be repaired by means of a pressurized fluid, like air and water. The tubular liner bag is made of a flexible resin-absorbent material layer impregnated with a thermosetting liquid resin, and has the outer surface covered with an impermeable plastic film.

More particularly, according to the publication, the tubular flexible liner bag is closed at one end and open at the other; the tubular flexible liner bag is first flattened. Then, the open end of the tubular liner bag is made to gape wide and hooked (anchored) at the end of the defective or old pipe in a manner such that the wide-opened end of the liner bag completely and fixedly covers and closes the pipe end; a portion of the liner bag in the vicinity of the pipe end is pushed into the pipe so as to create an annular pocket; then, the pressurized fluid is applied to the annular pocket of the tubular liner bag such that the fluid urges the tubular liner bag to enter the pipe. Since one end of the tubular liner bag is hooked at the end of the pipe, it remains there while the rest of the flexible liner bag is turned inside out or evaginated under fluid pressure as it proceeds deeper in the pipe. (Hereinafter, this manner of insertion shall be called "everting".) When the entire length of the tubular liner bag is everted (i.e., turned inside out) into the pipe, the everted tubular liner bag is pressed against the inner wall of the pipe by the said pressurized fluid or by an inflatable pressure bag, and the tubular flexible liner bag is hardened as the thermosetting liquid resin impregnated through the thickness of the liner bag is heated, which is effected by heating the fluid filling the tubular liner bag by means of a hot steam, etc. Thereafter the closed end of the liner bag is cut off. It is thus possible to line the inside wall of the defective or old pipe with a rigid liner without digging the ground and disassembling the pipe sections.

This pipe lining method is similarly applicable to a branch pipe which is in fluid communication with a main pipe such as sewer pipes. Some of the present inventors formerly proposed in a patent application a branch pipe lining method wherein a branch pipe is internally lined with a branch pipe liner bag having a collar-like flange at its open end. More particularly, according to this prior art method, the branch pipe liner bag is positioned in the main pipe and the collar of the branch pipe liner bag is fitted closely on the margin of the opening of the hole defined by the branch pipe; then, the branch pipe liner bag is everted into the branch pipe under fluid pressure so that the liner bag goes up toward the surface of the earth from the main pipe; and when the eversion is completed and the liner bag is closely pressed against the inner face of the branch pipe, the hardenable liquid resin impregnated through the branch pipe liner bag is hardened by heating or some other procedure.

After the branch pipe is internally lined by this branch pipe lining method, the main pipe is lined with a main pipe liner by the conventional pipe lining method as described above. However, this main pipe liner closes the hole by which the branch pipe opens into the main pipe, and, thus, it is necessary to make a hole through the main pipe liner to restore the communication between the main pipe and the branch pipe.

If the inner diameter of the main pipe is smaller than 800 mm, a man cannot enter the main pipe and it is necessary to use a boring robot with a cutter, which is introduced in the main pipe and remote-controlled from the ground to wield the cutter so as to make a hole through that portion of the main pipe liner which closes the branch pipe.

The Problems the Invention Seeks to Solve

However, it requires a dexterity to properly control the boring robot in the operation of making a hole through the main pipe liner, and when the operator is not very careful, the robot's cutter is liable to attack the collar and other unintended portions of the branch pipe liner. When such inadvertent attacks cause breaks, the ground water would penetrate through them into the pipes to cause problems. In certain special cases wherein the connection of the branch pipes to the main pipe is of such configuration that renders the hole making operation difficult, it was inevitable to cause damages on the branch pipe liner by the cutter.

It was, therefore, conceived to protect that portion of the inner face of the branch pipe liner which is adjacent to the collar with a protective member after the branch pipe lining operation.

However, that portion of the main pipe liner which is to be cut off (that is, the portion which closes the branch pipe opening) is curved to fit the curvature of the inner wall of the main pipe, so that the preset length of the stroke of the cutter of the boring robot required to penetrate through the liner varies depending on the inner diameter of the main pipe and that of the branch pipe; furthermore, the required stroke length is also dependent on the boring point along the circumference of the branch pipe opening; consequently, the stroke length has to be set to a maximum required value so that the amount of the thrust of the cutter into the branch pipe liner tends to be large. To cope with this, it was sometimes necessary to protect the inner face of the branch pipe liner with a protective member having a height of no less than 20 mm or even 100 mm, and it was not an easy task to push such a longish protective member into the branch pipe.

Since the protective member is made of a rigid material such as metal, it is not resilient, and, as shown in FIG. 12, a branch pipe (111) is often connected to the main pipe (110) not orthogonally, but at an angle θ, e.g. 45° or 60°, or a branch pipe (211) is connected to the main pipe (210) via an elbow (230) of an angle 45°, 60° or 90°, as shown in FIG. 13; all of these facts tend to render it virtually impossible to properly insert a lengthy protective member into a branch pipe liner.

The present invention was made in view of the above problem and others, and it is, therefore, an object of the invention to provide a new branch pipe liner which is not liable to be damaged by the robot cutter irrespective of the inner diameters of the main pipe and the branch pipe or of the configuration by which the branch pipe is connected to the main pipe; also it is another object of the invention to provide a new method for lining an underground pipe by which it is possible to conduct the boring operation in the main pipe without damaging the branch pipe liner.

SUMMARY OF THE INVENTION

Means to Solve the Problems

In order to solve the above problems and others, there is proposed a branch pipe liner assembly which has:

a flexible, liquid resin-absorbent, tubular branch pipe liner adapted to be everted under fluid pressure into a branch pipe from a main pipe so that the liner extends toward the surface of the earth from the main pipe, a rigid collar having a curvature resembling to that of the inner wall of the main pipe where the branch pipe meets the main pipe, the collar formed by turning an open end of the tubular branch pipe liner inside out and hardening the turned portion of the liner by means of a hardenable liquid resin, a highly airtight polymer film bag in which the tubular branch pipe is contained in a manner such that the entire outer face of the tubular branch pipe and that face of a tiny portion of the collar which is immediately continuous from the end of the outer face of the tubular branch pipe are closely covered with the film bag, and a rigid protective member consisting of a first portion which is out-spread downwardly and curved to fit on the lower face of the collar and is fixed thereto, a second portion which is roughly cylindrical and fitted into the inner peripheral face of the collar and the inner wall of a little part of the tubular branch pipe liner which is immediately continuous from the collar, and a third portion which extends downwardly and terminates in an annular end face at a location substantially lower than the joint where the first portion and the second portion meet.

A preferred embodiment of the branch pipe liner assembly has a plurality of penetrating holes made through the collar at locations which are not covered by the protective member.

In an embodiment one end portion of an airtight detachable film tube is detachably pasted to the outer face of that part of the tubular branch pipe liner which is close to the collar, over the polymer film bag.

Preferably, the protective member is made of metal.

Also, the first portion of the protective member is preferably fixed to the lower face of the collar by means of bolts and nuts.

Preferably, the third portion of the protective member is of such a size that it extends into the main pipe by a depth of from 10 to 50 mm, as of the time when the tubular branch pipe liner has been entirely everted into the branch pipe.

Also preferably, the second portion of the protective member has a height such that it covers that portion of the tubular branch pipe liner which is immediately continuous from the collar over a length of from 10 to 50 mm, as measured along the length of the tubular branch pipe liner.

It is also preferred that the annular end face of the third portion of the protective member is flush and forms a horizontal plane.

Also preferably, the inner diameter of the annular end of the third portion of the protective member is smaller than that inner diameter of the branch pipe liner which is measured after the liquid resin in it has been cured.

In another embodiment, the third portion of the protective member is converged downwardly and has its minimum inner diameter at the lower end.

A novel pipe lining method is also proposed which comprises the steps of:

(i) lining the branch pipe with a novel branch pipe liner assembly, which is described above;

(ii) lining the main pipe with a conventional main pipe liner; and (iii) cutting a hole through that circular portion of the main pipe liner which is defined by the annular end face of the third portion of the protective member by means of a boring robot.

In a modified embodiment, the rigid protective member is fixed to the collar after the lining of the branch pipe is completed.

In an embodiment, the boring robot is remote-controlled from the ground, while being watched through a first TV camera stationed in the branch pipe and a second TV camera stationed in the main pipe.

Preferably, the boring robot has a spin grinder which is capable of shifting vertically and has a diameter smaller than the inner diameter of the annular end of the third portion of the protective member, and whose upper and lower faces are abrasive.

In another preferred embodiment, the boring robot has a conical spin grinder which is capable of shifting vertically and has a maximum diameter similar to or greater than the inner diameter of the annular end of the third portion of the protective member.

Effects of the Invention

According to the invention, therefore, after the branch pipe is lined with the branch pipe liner of the novel branch pipe liner assembly, the third portion of the protective member attached to the collar of the branch pipe liner assembly extends substantially into the main pipe so that the main pipe liner is pushed by the same amount away from the collar to enable the boring robot to effect the cutting of the liner at a position substantially away from the collar while maintaining the necessary stroke to cut through the main pipe; also it is possible to reduce the amount of that portion of the second portion of the protective member which is inserted into branch pipe. As the result, irrespective of the inner diameters of the main pipe and the branch pipe or of the configuration by which the branch pipe is connected to the main pipe, it is possible to conduct the boring operation on the main pipe liner without damaging the branch pipe liner by the boring robot.

The above and other objects and features of the invention will appear more fully hereinafter in the following description given in connection with the accompanying drawings and the novelty thereof pointed out in the appended claims.

EMBODIMENTS

Next, embodiments of the invention will be described with reference to the attached drawings.

Embodiment 1

Figure 1:
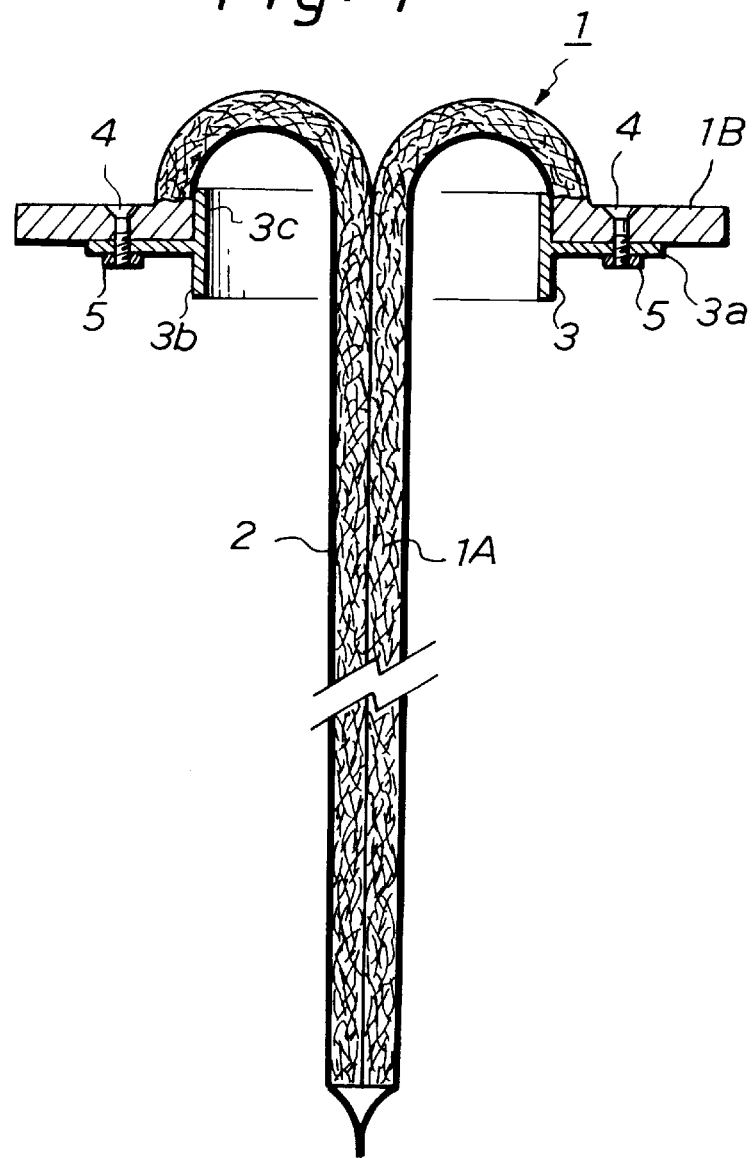
FIG. 1 is a cross section of a branch pipe liner assembly according to a first embodiment of the invention.
Figure 2:
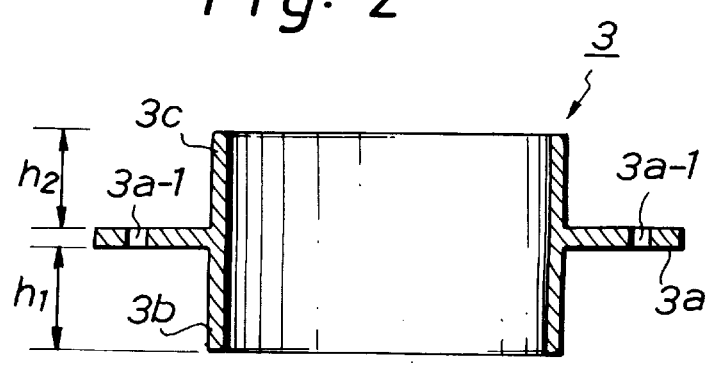
FIG. 2 is a detailed cross section of a protective member.

FIG. 1 is a sectional view of a branch pipe liner assembly according to a first embodiment of the invention, and FIG. 2 is a sectional view of a protective member to protect lining against boring.

As shown in FIG. 1, a branch pipe liner assembly 1 comprises a hardenable liquid resin-containing flexible member 1A, which is a tubular liquid resin-absorbent fabric material soaked with an uncured hardenable liquid resin, a rigid collar 1B formed by turning an open end of the tubular liquid resin-absorbent fabric material inside out and hardening the turned portion of the fabric material, a highly airtight polymer film 2, which covers up the entire outer face of the hardenable liquid resin-containing member 1A and that face (inner circumferential face, as seen in FIG. 1) of a tiny portion of the collar 1B which is immediately continuous from an end of the outer face of the member 1A, and a tubular protective member 3, which is cylindrical with a flange 3a extending outward from the middle of the cylindrical body. The upper face of the annular plate 3a is attached to the lower face of the collar member 1B ("upper" and "lower" being merely as seen in FIG. 1). Incidentally, the lower end of the hardenable liquid resin-containing member 1A of the branch pipe liner assembly 1 is airtightly sealed with the polymer film 2.

The above-mentioned tubular liquid resin-absorbent fabric material is a nonwoven fabric obtained by bonding or punch-pressing a mass of fiber such as of polyester, polypropylene, and acrylic polymer; the uncured hardenable liquid resin to impregnate the fabric material is selected from thermosetting resins such as unsaturated polyester, epoxy, and vinyl ester. The polymer film 2 is prepared in the form of a single layer or multi-layer seamless tube by the inflation method, and is made of a material such as polyurethane, polyethylene, nylon, ethylene vinyl alcohol, Admer (the name of a commercial product), ionomer and polyvinyl chloride. Also, the polymer film 2 is attached to the surfaces of the hardenable liquid resin-containing member 1A and the collar 1B by welding, bonding or coating.

Figure 3:
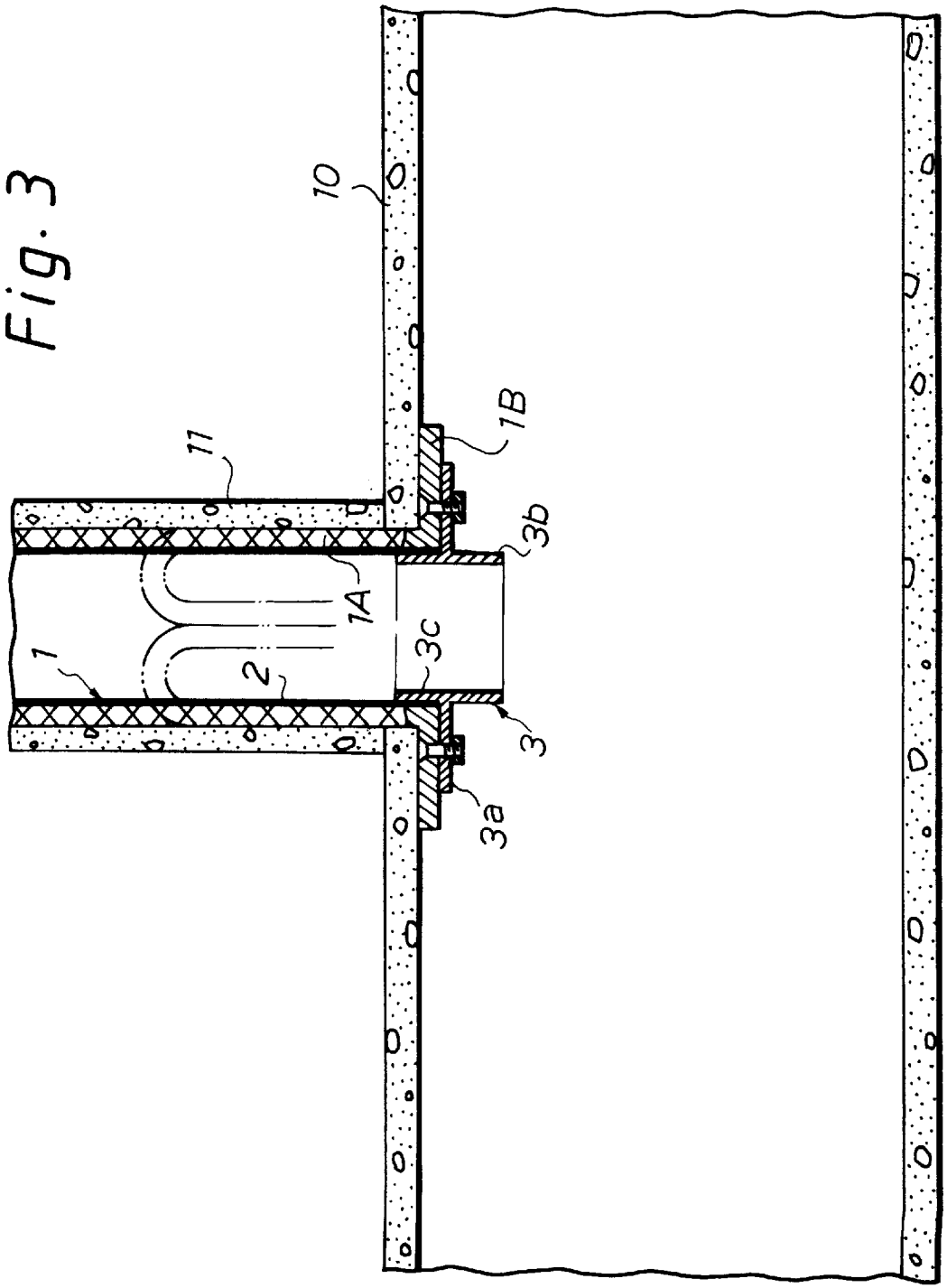
FIG. 3 is a cross sectional view illustrating a pipe lining method according to the invention.

Incidentally, the collar 1B of the branch pipe liner assembly 1 is preferably prepared before the tubular liquid resin-absorbent fabric material is impregnated with the liquid resin. As described above, the upper end portion of the tubular liquid resin-absorbent fabric material is turned inside out and is impregnated with a liquid thermosetting resin such as unsaturated polyester resin, epoxy resin, vinyl ester resin, phenolic resin, urethane resin, and silicone resin, and the collar 1B is hardened after it is flexed to have a curvature that is nearly equal to the curvature of the inner wall of a main pipe 10 (ref. FIG. 3).

The protective member 3 is made of a metal such as stainless steel (SUS), and, as shown in detail in FIG. 2, the flange 3a extends outward from the middle of the cylindrical body and has a curvature that is nearly equal to the curvature of the collar 1B, and a plurality of circular holes 3a-1 are made through the flange 3a. As already described above, the upper face of the flange 3a of the protective member 3 is attached to the lower face of the collar 1B (as seen in FIG. 1), and this attachment is effected by bolts 4, which are inserted through the collar 1B and the respective holes 3a-1 of the flange 3a and are tightly screwed into respective nuts 5. Now with reference to FIG. 2, that portion of the cylindrical body of the protective member 3 which is disposed below the flange 3a and has a height h1 (hereinafter referred to as "protrusion 3b") will extend downward beyond the collar 1B; on the other hand, that portion of the cylindrical body of the protective member 3 which is disposed above the flange 3a and has a height h2 (hereinafter referred to as "protection 3c") will cover up a part of the outer face of the hardenable liquid resin-containing member 1A before eversion to thereby protect that part. Incidentally, the heights h1 and h2 of the protrusion 3b and the protection 3c of the protective member 3 are set to values in the range of 10 to 50 mm.

Next, we will explain how the pipe lining method of the present invention is carried out. FIGS. 3 through 7 are cross sectional views illustrating the inventive method for lining an underground pipe in the order of procedure.

In FIG. 3, the reference numeral 10 designates an underground main sewer pipe, and the reference numerals 11 designates a branch pipe, which meets the main pipe 10 for allowing fluid within to flow into the main pipe. The inner diameter of the branch pipe is smaller than that of the main pipe 10. According to the pipe lining method of the present invention, the main pipe 10 is internally lined with a main pipe liner 6, described later, after the branch pipe 11 is internally lined with the use of the branch pipe liner assembly 1; thereafter, the portion of the main pipe liner 6 which closes the branch pipe opening is bored off.

First, we describe how the branch pipe 11 is lined.

The lining of the branch pipe 11 is effected with a use of the branch pipe liner assembly 1, shown in FIG. 1; the branch pipe liner assembly 1 is introduced into the main pipe 10 by means of a remote-controlled robot, not shown, and then, as shown in FIG. 3, after the collar 1B is fitted closely on that portion of the inner wall of the main pipe 10 which constitutes the margin of the opening by which the branch pipe 11 opens into the main pipe 10, the resin-containing flexible member 1A is everted into the branch pipe 11 under fluid pressure such as air pressure so that the liner bag goes up toward the surface of the earth from the main pipe 10.

When the resin-containing flexible member 1A of the branch pipe liner assembly 1 everted and inserted into the branch pipe 11 extends throughout the entire length of the branch pipe 11, fluid pressure is exerted inside the branch pipe liner assembly 1 so that the resin-containing flexible member 1A is inflated and pressed against the inner wall of the branch pipe 11; while this state of things is maintained, the resin-containing flexible member 1A is heated so that the thermosetting resin impregnated in this is cured to harden. Thus, the branch pipe 11 is internally lined with the hardened resin-containing member 1A, and the branch pipe 11 is repaired.

As of the time when the lining of the branch pipe 11 is completed, the protrusion 3b of the protective member 3, which is attached to the collar 1B of the branch pipe liner assembly 1, protrudes inside the main pipe 10, and the protection 3c of the protective member 3 is disposed to cover up the inner circumferential face of the collar 1B and a tiny portion of the inner circumferential face of the resin-containing member 1A which is immediately continuous from the collar 1B to thereby protect those portions.

When the lining of the branch pipe 11 is completed, as described above, the main pipe 10 is lined next.

Figure 4:
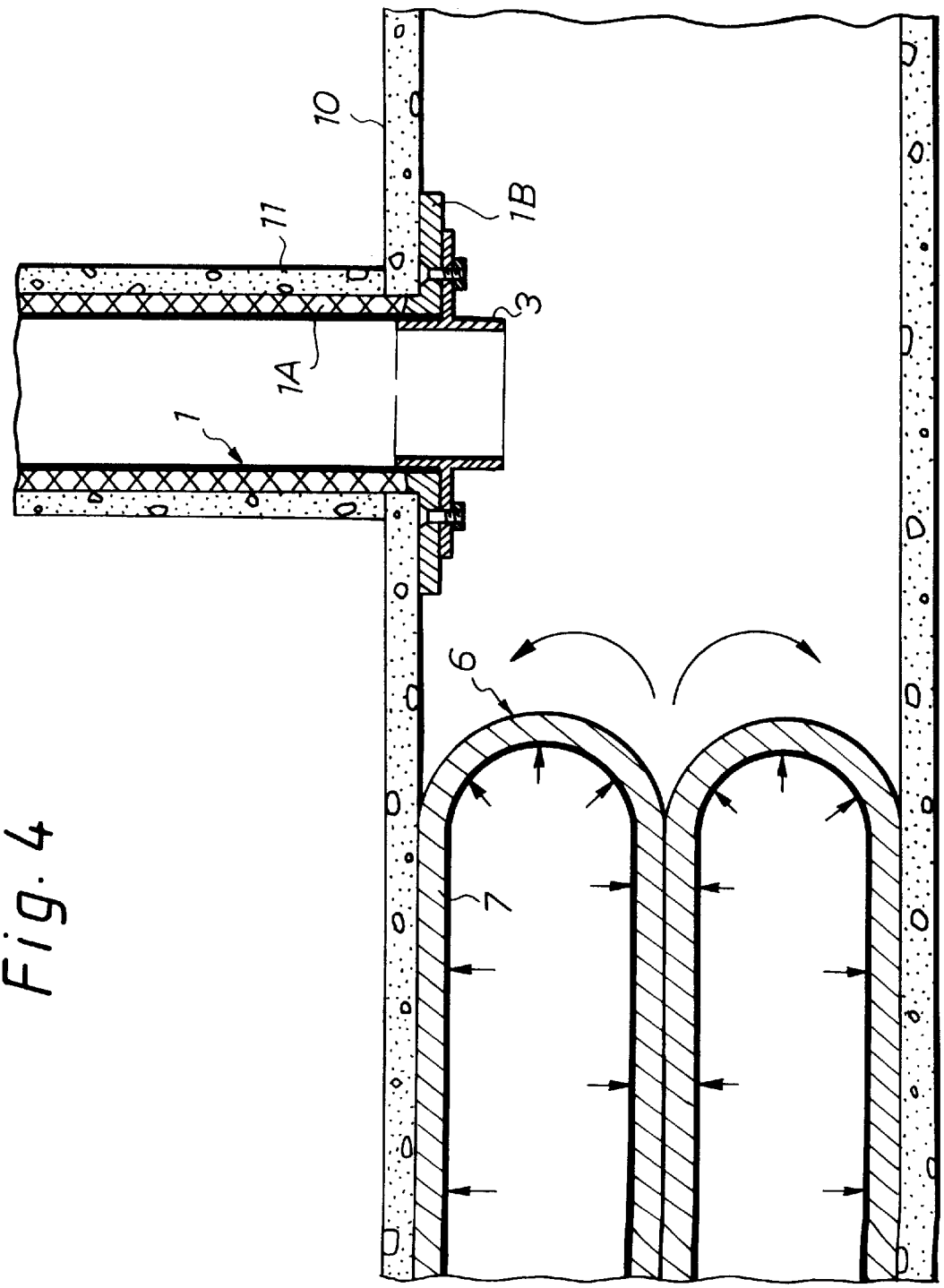
FIG. 4 is a cross sectional view illustrating the pipe lining method according to the invention.

As shown in FIG. 4, the main pipe liner 6 is inserted by eversion into the main pipe 10 under fluid pressure such as air pressure. The main pipe liner 6 consists of a tubular resin-absorbent fabric material impregnated with an uncured hardenable liquid resin and a highly airtight polymer film, which covers up the outer face of the tubular fabric material. Incidentally, the polymer film 7 and the tubular resin-absorbent fabric material and the hardenable liquid resin to constitute the main pipe liner 6 are identical to those used in the branch pipe liner assembly 1.

Figure 5:
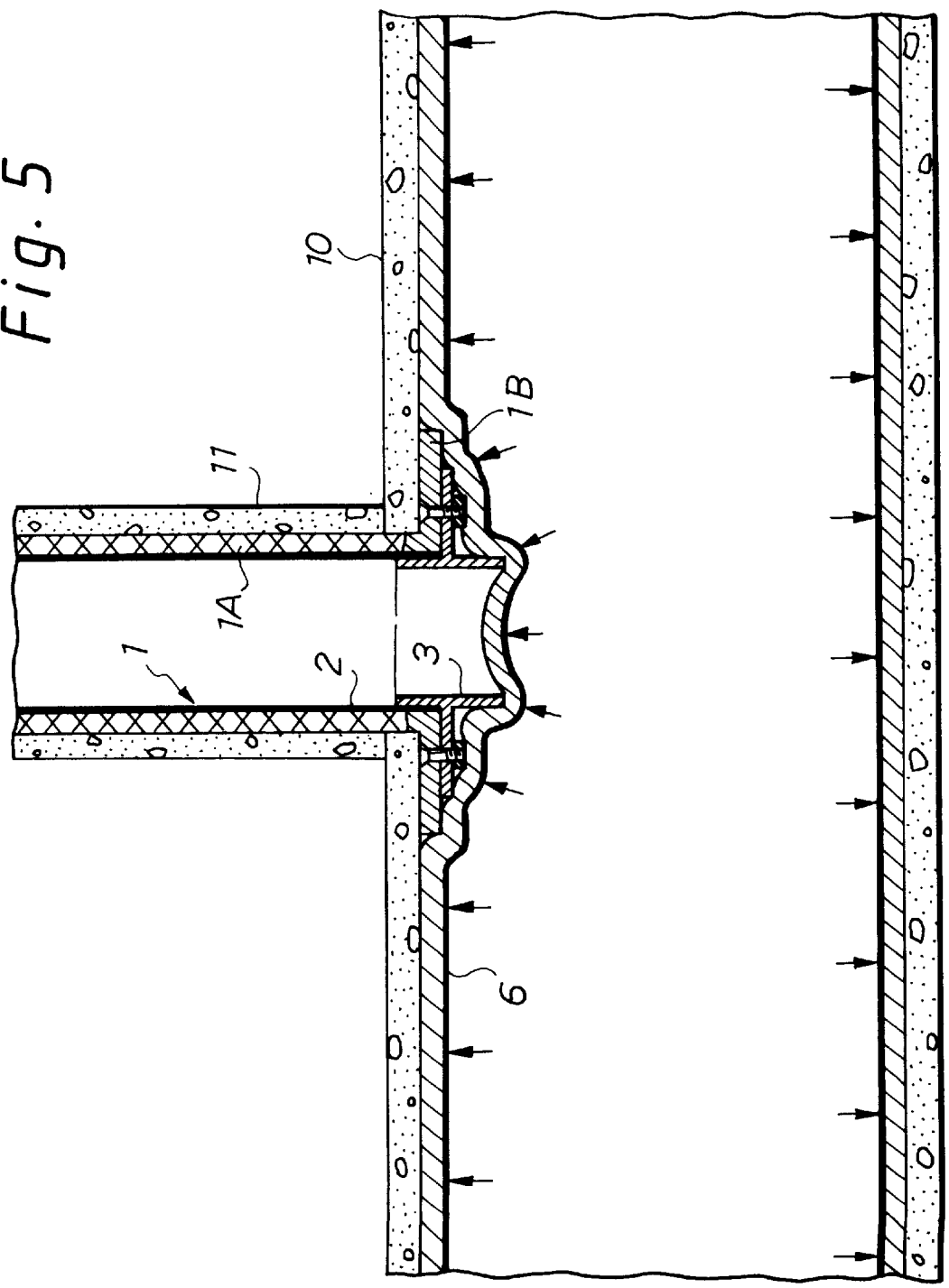
FIG. 5 is a cross sectional view illustrating the pipe lining method according to the invention.

When the main pipe liner 6 everted and inserted into the main pipe 10 extends throughout the entire length of a unit of the main pipe 10, as shown in FIG. 5, fluid pressure is exerted inside the main pipe liner 6 so that the main pipe liner 6 is inflated and pressed against the inner wall of the main pipe 10; while this state of things is maintained, the main pipe liner 6 is heated by means of a heating procedure, which may be selected from any conventional methods, so that the thermosetting resin impregnated in the main pipe liner 6 is cured to harden. Thereupon, the main pipe 10 is internally lined with the hardened main pipe liner 6, and the main pipe 10 is repaired; the collar 1B of the branch pipe 11 is substantially joined by the main pipe liner 6 and form an integral liner with the main pipe liner 6.

Figure 6:
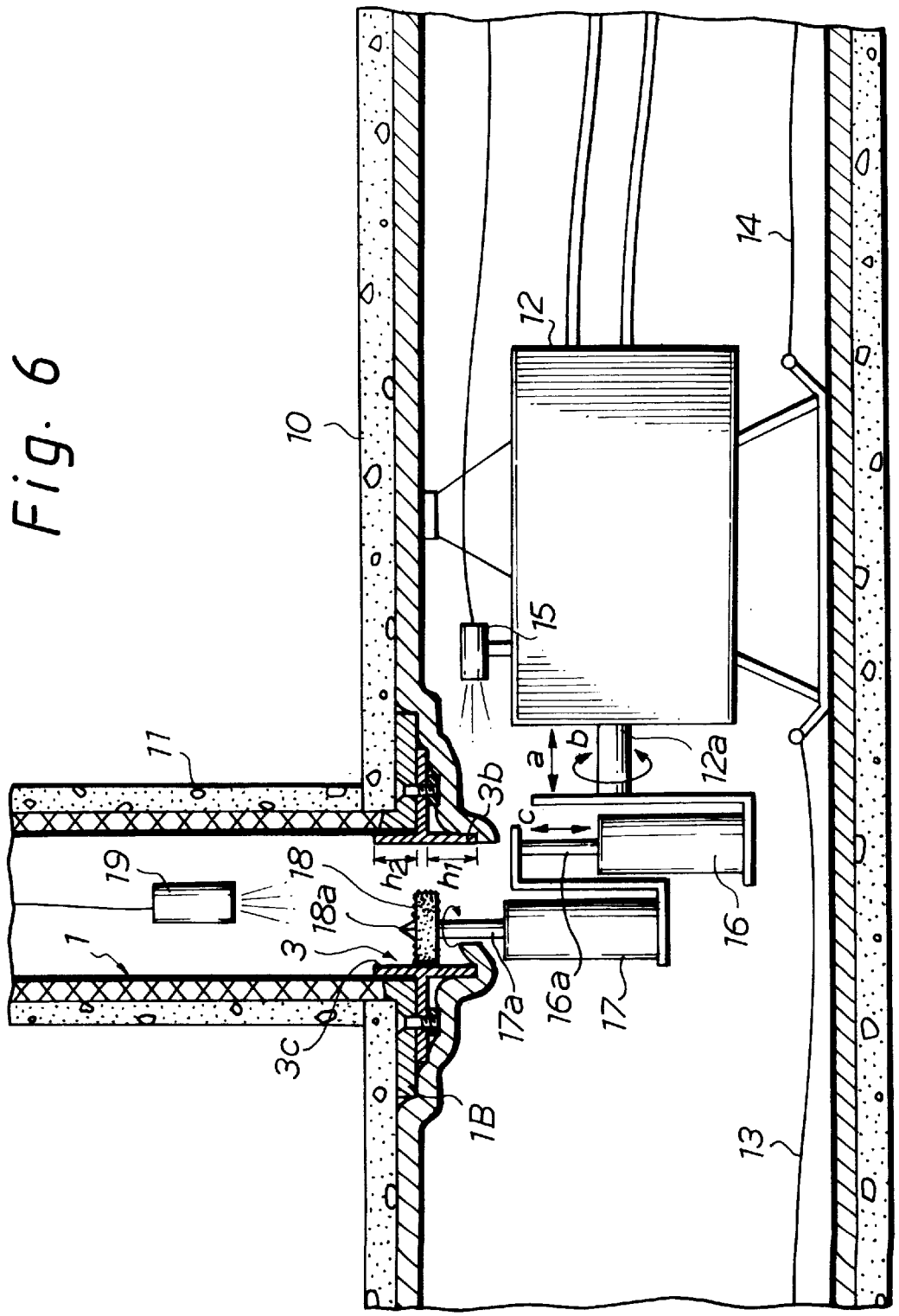
FIG. 6 is a cross sectional view illustrating the pipe lining method according to the invention.

Now, when the inner wall of the main pipe 10 is lined with the main pipe liner 6, the branch pipe opening of the main pipe 10 (the opening by which the branch pipe 11 opens into the main pipe 10) is closed by the main pipe liner 6, so that it is necessary to make a hole through the main pipe liner 6 where the branch pipe 11 is closed to restore the communication between the main pipe 10 and the branch pipe 11, as shown in FIG. 6.

With reference to FIG. 6 again, an on-the-sleigh boring robot 12 is introduced inside the main pipe 10 in order to effect the boring operation on the main pipe liner 6. This boring robot 12 has a horizontal head rod 12a, which is hydraulically driven to reciprocate in the directions shown by a double-pointed arrow a, and also to spin round as shown by a double-pointed circular arrow b. One pull rope 13 is tied at the front part of the sleigh of the robot 12, and another pull rope 14 is tied at the rear part of the sleigh. A TV camera 15 for monitoring is affixed on top of the main body of the 12. Further, a hydraulically operated piston cylinder 16 having an upward piston rod 16a is mounted on a mount supported by the head rod 12a of the boring robot 12. The piston rod 16a is adapted to shift vertically as indicated by a double-pointed arrow C, and supports a hydraulically operated motor 17 by means of a mount it holds at its upper end. A grinder assembly 18 is locked about an end of an upward output shaft 17a of the motor 17. This grinder assembly 18 chiefly consists of a thick disc-shaped plate having two abrasive faces perpendicular to the central axis and an abrasive peripheral surface of rotation parallel to the central axis, and a tapered reamer 18a, which is provided to form the spire of the assembly 18 rising from the middle of the upper face of the disc-shaped plate. The outer diameter of the disc-shaped plate is smaller than the inner diameter of the protective member 3.

While its position in the main pipe 10 is being monitored by means of the TV camera 15 mounted on the boring robot 12 and by means of another TV camera 19 introduced in the branch pipe 11 from the ground, the boring robot 12 is moved to and fro in the main pipe 10 by means of the pull rope 13 and the pull rope 14 until the grinder assembly 18 comes to a desired position for the cutting operation. Then, the hydraulically operated motor 17 is driven to spin the output shaft 17a so that the grinder assembly 18 is turned at a high speed; at the same time the piston cylinder 16 is driven the push up the piston rod 16a slowly so that the grinder assembly 18 is raised and, as the result, the tapered reamer 18a bores open a small hole in the main pipe liner 6, and then the abrasive disc-shaped plate bores a big hole, and through further controlling of the position of the grinder assembly 18 by means of the various operation of the head rod 12a, that portion of the main pipe liner 6 which closes the branch pipe opening (the portion which is defined by the protrusion 3b of the protective member 3) is ground off by the grinder assembly 18. Throughout this grinding operation, the inner circumferential face of the collar 1B of the branch pipe liner assembly 1 and the said tiny portion of the inner circumferential face of the resin-containing member 1A are protectively covered under the metallic protective member 3, so that these parts are not liable to be damaged by the grinder assembly 18, and thus the problems such as leakage of the ground water through the damaged liner into the pipes are avoided.

Now, in the embodiment of the invention, as of the time of completion of the lining of the branch pipe 11, the protrusion 3b of the protective member 3, which is attached to the collar 1B of the branch pipe liner assembly 1, protrudes into the main pipe 10 by a length of h1, so that the main pipe liner 6 is pushed by the same amount away from the collar 1B to enable the grinder assembly 18 to effect the cutting of the liner at a position substantially away from the collar 1B while maintaining the necessary stroke to cut through the main pipe liner 6; also it is possible to reduce the amount of that portion of the protection 3c of the protective member 3 which is inserted into the branch pipe liner assembly 1 by h1. As the result, irrespective of the inner diameters of the main pipe 10 and the branch pipe 11 or of the configuration by which the branch pipe 11 is connected to the main pipe 10, it is possible to conduct the boring operation on the main pipe liner 6 without damaging the branch pipe liner assembly 1 by the grinder assembly 18.

Figure 7:
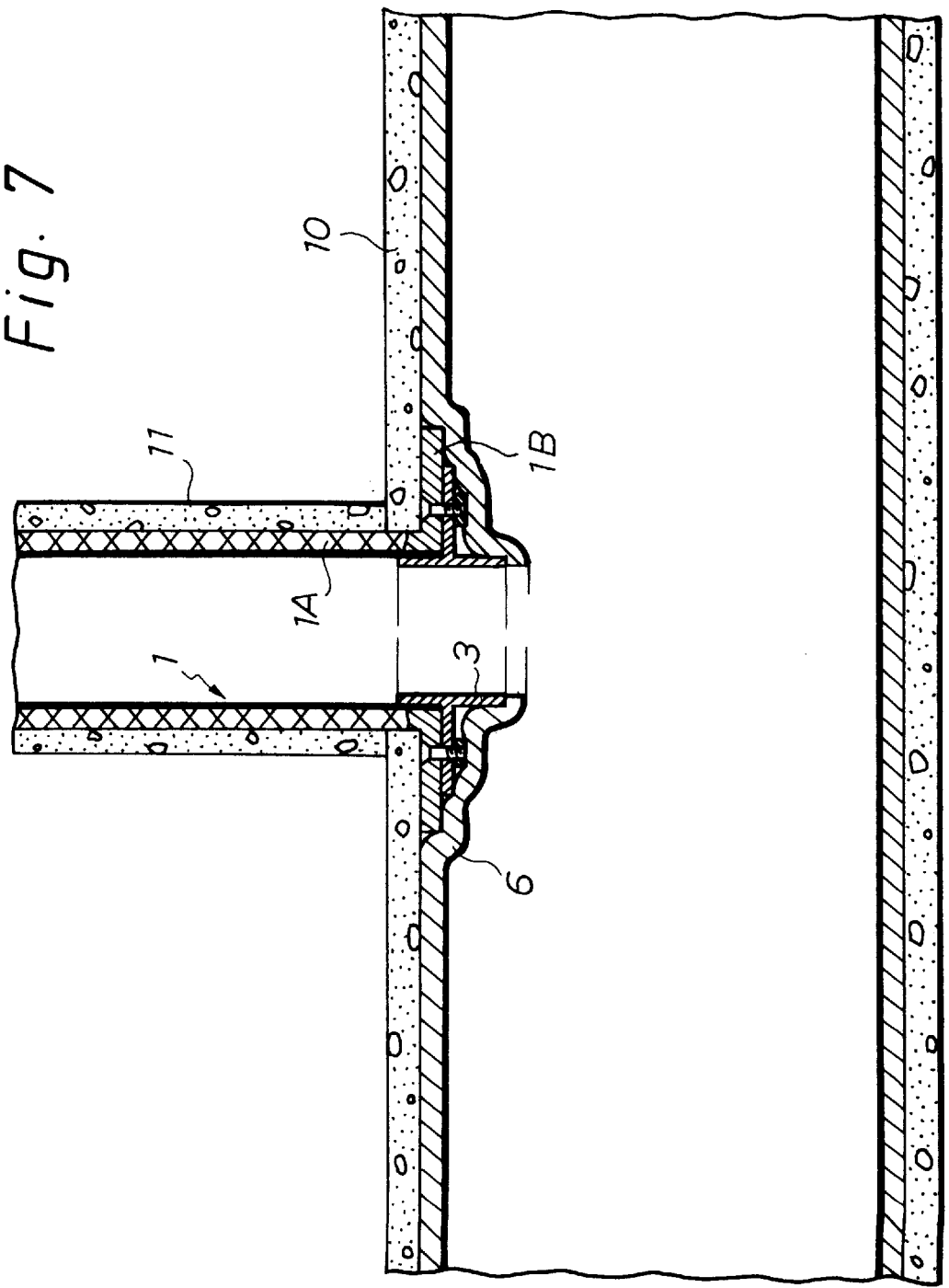
FIG. 7 is a cross sectional view illustrating the pipe lining method according to the invention.

Now, when that portion of the main pipe liner 6 is cut off by the grinder assembly 18 where the branch pipe opening is covered up, in a manner as described above, the branch pipe 11 opens into the main pipe 10 whereby the both pipes communicate with each other via this opening, as shown in FIG. 7; and by virtue of the protective member 3, the branch pipe liner assembly 1 is perfectly immune from the damaging approach of the grinder assembly 18, so that there will be no breakage in the branch pipe liner assembly 1 and no ground water will leak into the main pipe 10 through the branch pipe liner assembly 1.

Figure 8:
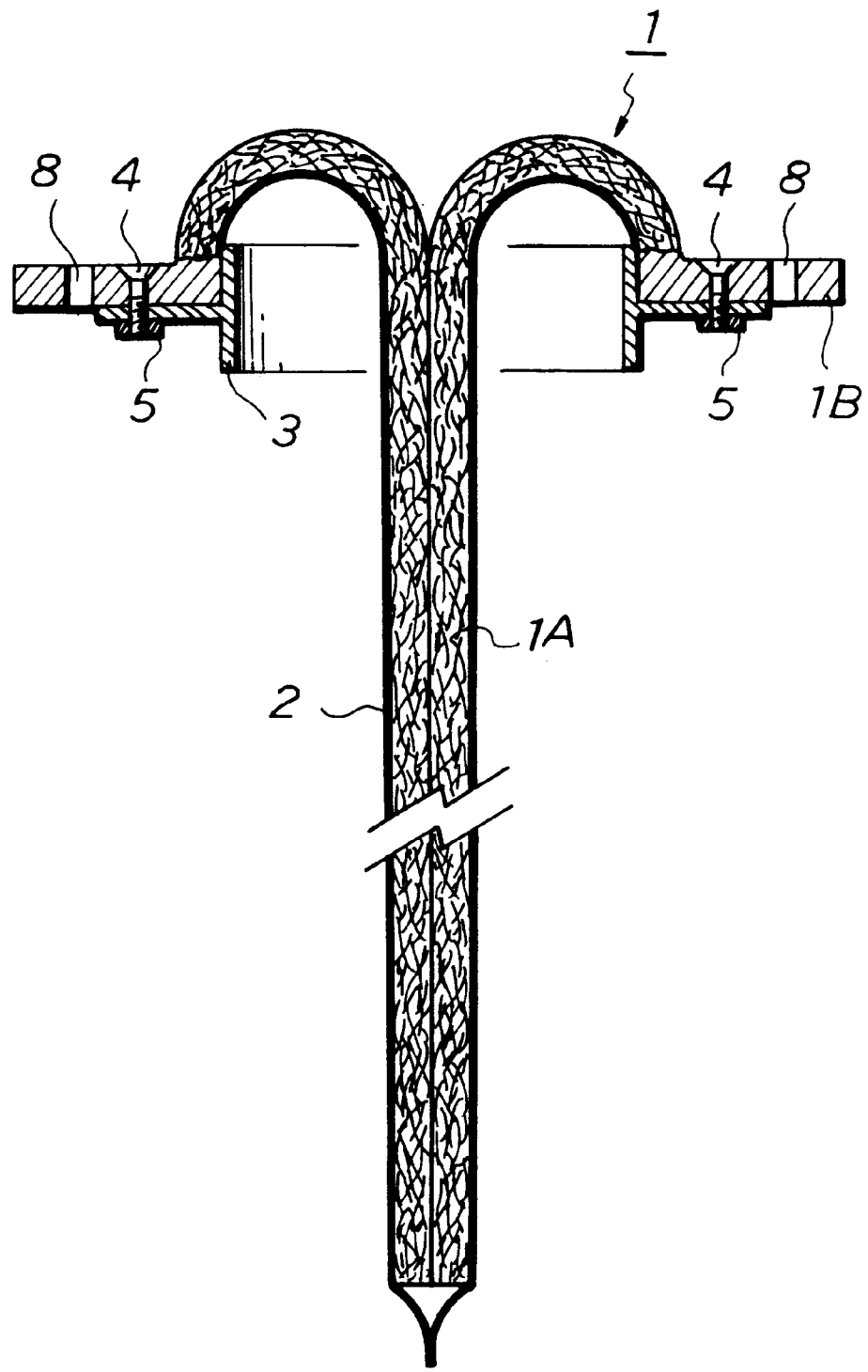
FIG. 8 is a cross section of a modified branch pipe liner assembly according to the first embodiment of the invention.

Incidentally, in the cases where the inner diameter of the main pipe 10 is sufficiently large, such as 800 mm or greater, so that a man can enter the main pipe 10, it is possible to attach the protective member 3 to the collar 1B of the branch pipe liner assembly 1 from the main pipe 10 after the lining of the branch pipe 11 is completed. Also, as shown in FIG. 8, a plurality of circular holes 8 are made through the collar 1B of the branch pipe liner assembly 1, so that some of the hardenable liquid resin which oozes out from the main pipe liner 6 when the main pipe liner 6 is hardened will enter and harden in the circular holes 6 whereby the collar 1B of the branch pipe liner assembly 1 and the main pipe liner 6 will be joined together more strongly.

Embodiment 2

Next, we will explain a second embodiment of the present invention with reference to attached drawings.

Figure 9:
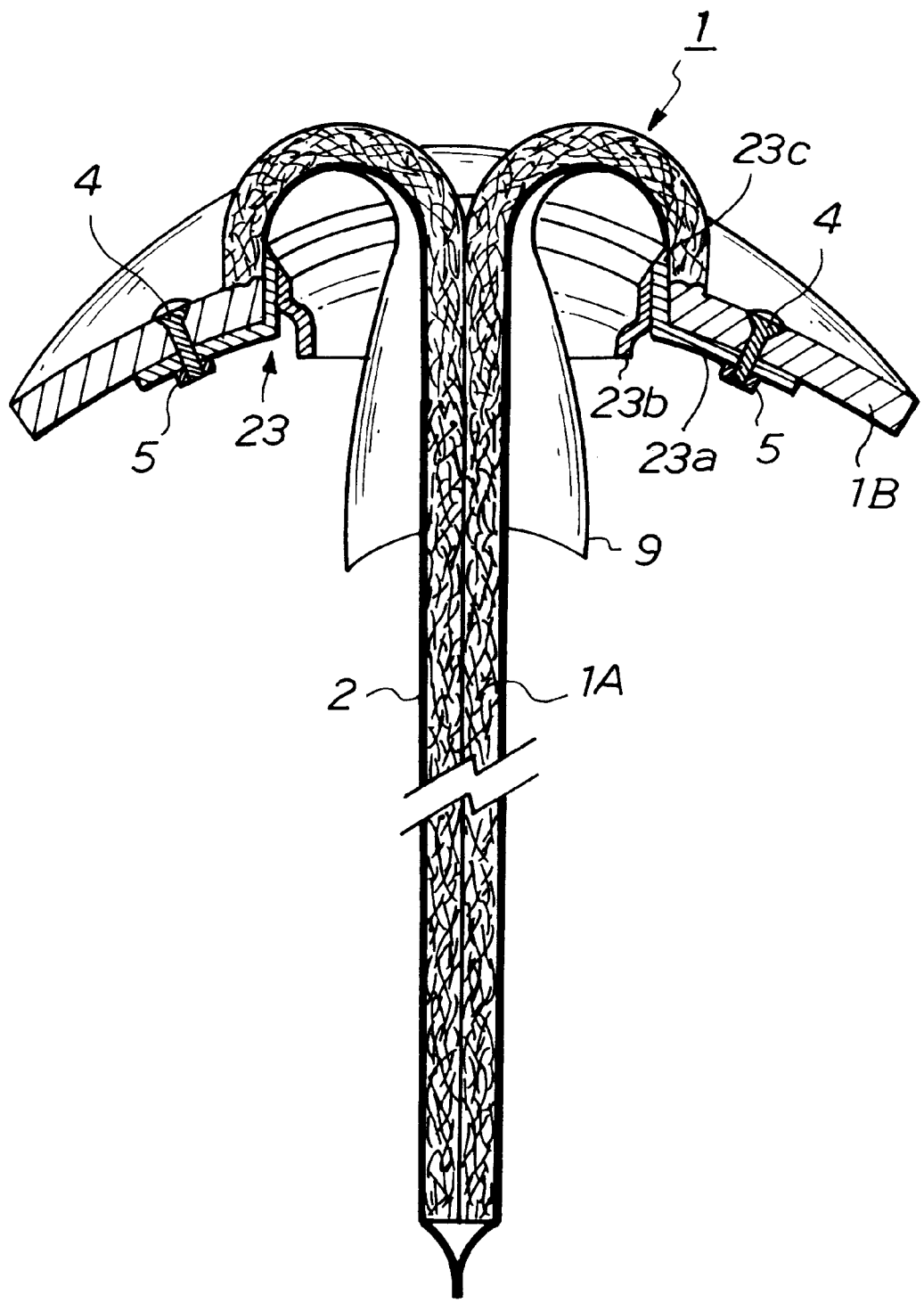
FIG. 9 is a cross section of a branch pipe liner assembly according to a second embodiment of the invention.

FIG. 9 is a sectional view of a branch pipe liner assembly, before eversion, according to the second embodiment of the invention, and in this figure those elements which have twin counterparts in FIG. 1 are designated by like numerals, and description of such elements are not repeated here.

In this second embodiment, similarly as in the first embodiment, a collar 1B of a branch pipe liner assembly 1 has its lower face partially covered up with a stainless steel (SUS) protective member 23, as seen in FIG. 9, by means of a plurality of bolts 4 and nuts 5; the protective member 23 consists of a flange 23a and a protection 23c, which is integrally formed with the flange 23a, and a protrusion 23b, which is welded to the internal face of the protection 23c. A highly airtight detachable tube 9 made of flexible film has its one end portion detachably pasted to that portion of the outer face of the evagenated part of a hardenable liquid resin-containing member 1A over the polymer film 2 which is close to the collar 1B. Incidentally, although a detailed description is omitted here, this detachable tube 9 is used in cases where the eversion of the branch pipe liner assembly 1 into the branch pipe 11 is effected by means of air pressure.

The flange 23a of the protective member 23 has a curvature that is nearly equal to the curvature of the collar 1B so as to fit on the latter closely, and the protection 23c attached on the inner periphery of the collar 1B has a height of 10 to 50 mm. The protrusion 23b, which is welded to the inner face of the protection 23c, has a shape of reducer having a decreased diameter at the lower end, and the lower end face is flush and forms a horizontal plane and is 10 to 50 mm extended below the inner peripheral end of the flange 23a.

Figure 10:
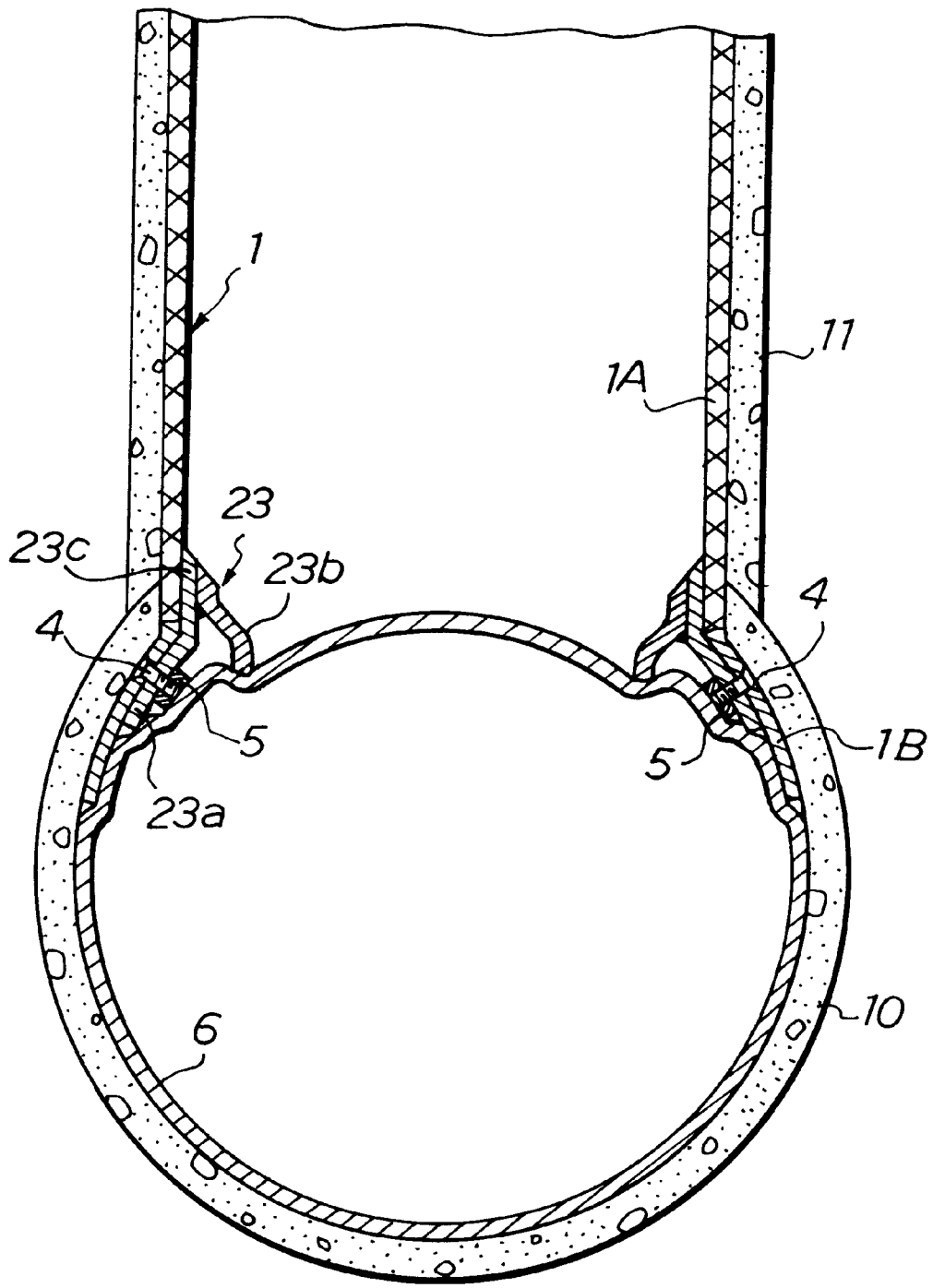
FIG. 10 is a vertical cross section of the main pipe and the branch pipe, illustrating the inventive pipe lining method.
Figure 11:
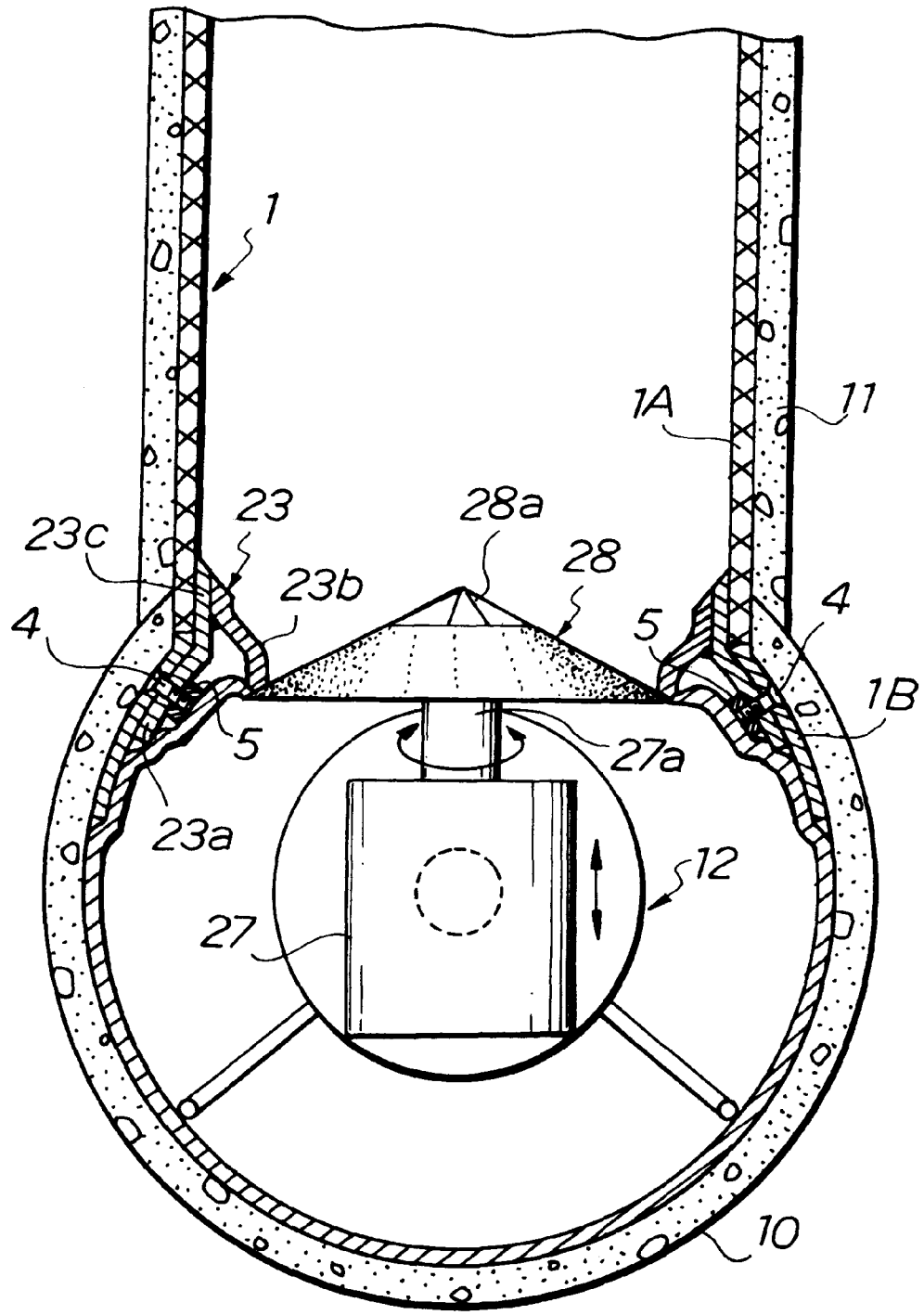
FIG. 11 is a vertical cross section of the main pipe and the branch pipe, illustrating the inventive pipe lining method.
Figure 12:
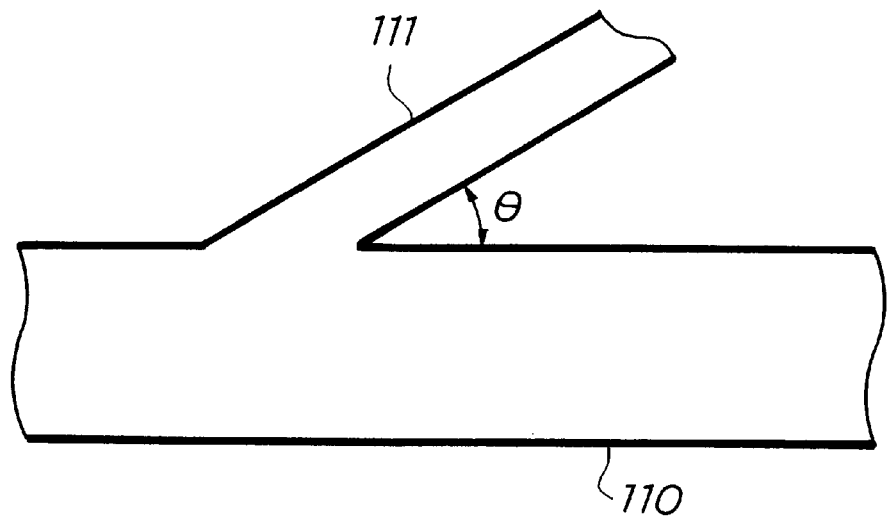
FIG. 12 is a conceptual cross-sectional view illustrating how a branch pipe is connected to a main pipe.
Figure 13:
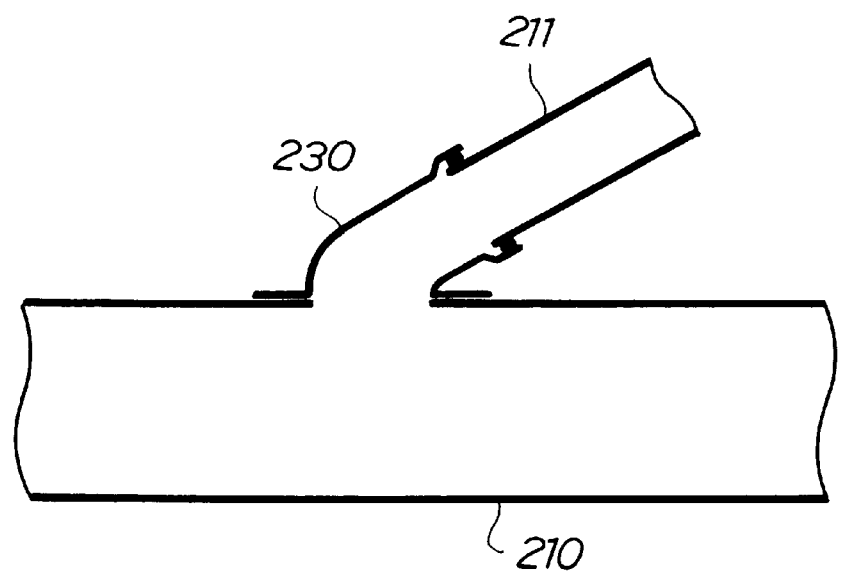
FIG. 13 is a conceptual cross-sectional view illustrating how a branch pipe is connected to a main pipe.

Next, we will explain chief steps of the pipe lining method of the present invention in which the branch pipe liner assembly 1 of the present embodiment is used, with reference to FIGS. 10 and 11. Incidentally, FIGS. 10 and 11 are cross sectional views of the main pipe 10 and the branch pipe 11, taken across a plane that is normal to the center line of the main pipe and passes the center of the hole by which the branch pipe opens into the main pipe, illustrating the inventive pipe lining method. In these figure, those elements which have twin counterparts in FIGS. 3 through 7 are designated by like numerals, and description of such elements are omitted here.

FIG. 10 shows how the things are when the lining operation on the main pipe 10 has been done with the main pipe liner 6 after the branch pipe 11 had been first lined with the resin-containing member 1A. It is seen that the 23c of the metallic protective member 23, which is fitted in the collar 1B of the branch pipe liner assembly 1, covers up the inner peripheral face of the collar 1B and a tiny portion of the inner peripheral face of the resin-containing member 1A which is immediately continuous from the collar 1B to thereby protect those portions. The protrusion 23b protrudes into the main pipe 10 by a desired amount (10 mm to 50 mm).

Now, as shown in FIG. 10, when inner wall of the main pipe 10 is lined with the main pipe liner 6, the branch pipe opening of the main pipe 10 (the hole by which the branch pipe 11 opens into the main pipe 10) is closed by the main pipe liner 6, so that it is necessary to make a hole through the main pipe liner 6 where the branch pipe 11 is closed to restore the communication between the main pipe 10 and the branch pipe 11, as shown in FIG. 11.

Now, as shown in FIG. 11, an on-the-sleigh boring robot 12 is introduced inside the main pipe 10 in order to effect the boring operation on the main pipe liner 6. In the forefront of this boring robot 12 is supported a hydraulically operated motor 27, which is disposed to shift vertically, and a conical grinder assembly 28 is locked about an end of an upward output shaft 27a of the motor 27.

This grinder assembly 28 has a tapered reamer 28a provided on top of a truncated conical abrasive main body, and the maximum diameter of the grinder assembly is roughly equal to or greater than the inner diameter of the protrusion 23b of the metallic protective member 23 at the lower periphery thereof.

While monitoring by means of two TV cameras, not shown, one stationed in the main pipe 10 and the other in the branch pipe 11, from the ground, the motor 27 is driven by means of remote-controlling to spin the output shaft 27a so that the conical grinder assembly 28 is turned at a high speed; at the same time the motor 27 is shifted higher slowly so that the conical grinder assembly 28 is raised and, as the result, that portion of the main pipe liner 6 which closes the branch pipe opening (the portion which is defined by the protrusion 23b) is ground off by the conical grinder assembly 28. When the conical grinder assembly 28 is butted against the lower periphery of the protrusion 23b of the protective member 23, as shown in FIG. 11, the protrusion 23b functions as a stopper and checks the uprising movement of the conical grinder assembly 28 so that the cutting stroke of the conical grinder assembly 28 is restricted, and the boring of the main pipe liner 6 is completed at the moment.

Thus, in this embodiment as well, the inner peripheral face of the collar 1B of the branch pipe liner assembly 1 and the tiny portion of the inner peripheral face of the resin-containing member 1A are protectively covered under the metallic protective member 23, so that these parts are not liable to be damaged by the conical grinder assembly 28, and thus the problems such as leakage of the ground water through the damaged liner into the pipes are avoided.

The protrusion 23b of the protective member 23, which is attached to the collar 1B of the branch pipe liner assembly 1, protrudes into the main pipe 10 by a certain amount, so that the main pipe liner 6 is pushed by the same amount away from the collar 1B to enable the conical grinder assembly 28 to effect the cutting of the liner at a position substantially away from the collar 1B while maintaining the necessary stroke to cut through the main pipe liner 6; also it is possible to reduce the amount of that portion of the protection 23c of the protective member 23 which is inserted into the branch pipe liner assembly 1 by the same amount by which the protrusion 23b protrudes into the main pipe 10. As the result, irrespective of the inner diameters of the main pipe 10 and the branch pipe 11 or of the configuration by which the branch pipe 11 is connected to the main pipe 10, it is possible to conduct the boring operation on the main pipe liner 6 without damaging the branch pipe liner assembly 1 by the conical grinder assembly 28.

While the invention has been described in its preferred embodiments, it is to be understood that modifications will occur to those skilled in the art without departing from the spirit of the invention. The scope of the invention is, therefore, to be determined solely by the appended claims.

What is claimed is:

1. A branch pipe liner assembly having:
 a flexible, liquid resin-absorbent, tubular branch pipe liner adapted to be everted under fluid pressure into a branch pipe from a main pipe so that said liner extends toward the surface of the earth from the main pipe,
 a rigid collar having a curvature resembling to that of the inner wall of the main pipe where the branch pipe meets the main pipe, said collar formed by turning an open end of said tubular branch pipe liner inside out and hardening the turned portion of said liner by means of a hardenable liquid resin, a highly airtight polymer film bag in which said tubular branch pipe liner is contained in a manner such that the entire outer face of the tubular branch pipe liner and that face of a tiny portion of the collar which is immediately continuous from the end of the outer face of the tubular branch pipe liner are closely covered with said film bag, and a rigid protective means consisting of a first portion which is out-spread downwardly and curved to fit on the lower face of said collar and is fixed thereto, a second portion which is roughly cylindrical and fitted into the inner peripheral face of the collar and the inner wall of a little part of the tubular branch pipe liner which is immediately continuous from the collar, and a third portion which extends downwardly and terminates in an annular end face at a location substantially lower than the joint where the first portion and the second portion meet.

2. The branch pipe liner assembly as claimed in claim 1, wherein a plurality of penetrating holes are made through the collar at locations which are not covered by said protective means.

3. The branch pipe liner assembly as claimed in claim 1, wherein an airtight detachable tube made of flexible film has its one end portion detachably pasted to the outer face of that part of the tubular branch pipe liner which is close to the collar, over said polymer film bag.

4. The branch pipe liner assembly as claimed in claim 1, wherein said protective means is made of metal.

5. The branch pipe liner assembly as claimed in claim 1, wherein said first portion of the protective means is fixed to the lower face of said collar by means of bolts and nuts.

6. The branch pipe liner assembly as claimed in claim 1, wherein said third portion of the protective means is of such a size that it extends into the main pipe by a depth of from 10 to 50 mm, as of the time when said tubular branch pipe liner has been entirely everted into the branch pipe.

7. The branch pipe liner assembly as claimed in claim 1, wherein said second portion of the protective means has a height such that it covers that portion of said tubular branch pipe liner which is immediately continuous from said collar over a length of from 10 to 50 mm, as measured along the length of the tubular branch pipe liner.

8. The branch pipe liner assembly as claimed in claim 1, wherein said annular end face of said third portion of the protective means is flush and forms a horizontal plane.

9. The branch pipe liner assembly as claimed in claim 1, wherein the inner diameter of said annular end of said third portion of the protective means is smaller than that inner diameter of the branch pipe liner which is measured after the liquid resin in it has been cured.

10. The branch pipe liner assembly as claimed in claim 1, wherein said third portion of the protective means is converged downwardly and has its minimum inner diameter at the lower end.

11. A pipe lining method comprising the steps of:

(a) preparing a branch pipe liner assembly having:

a flexible, liquid resin-absorbent, tubular branch pipe liner adapted to be everted under fluid pressure into a branch pipe from a main pipe so that said liner extends toward the surface of the earth from the main pipe, a rigid collar having a curvature resembling to that of the inner wall of the main pipe where the branch pipe meets the main pipe, said collar formed by turning an open end of said tubular branch pipe liner inside out and hardening the turned portion of said liner by means of a hardenable liquid resin, and a highly airtight polymer film bag in which said tubular branch pipe liner is contained in a manner such that the entire outer face of the tubular branch pipe liner and that face of a tiny portion of the collar which is immediately continuous from the end of the outer face of the tubular branch pipe liner are closely covered with said film bag, (b) fixing to the lower face of said collar a rigid protective means consisting of a first portion which is out-spread downwardly and curved to fit on the lower face of said collar, a second portion which is roughly cylindrical and adapted to fit into the inner peripheral face of the collar and the inner wall of a little part of the tubular branch pipe liner which is immediately continuous from the collar, and a third portion which extends downwardly and terminates in an annular end face at a location substantially lower than the joint where the first portion and the second portion meet;

(c) connecting said collar to that portion of the inner wall of the main pipe which constitutes the margin of the opening by which the branch pipe opens into the main pipe;

(d) everting said branch pipe liner under fluid pressure into the branch pipe from the main pipe;

(e) curing said liquid resin to thereby harden said branch pipe liner while the branch pipe liner is inflated, whereby the branch pipe is internally lined;

(f) everting a hardenable main pipe liner into the main pipe;

(g) hardening said main pipe liner while the main pipe liner is inflated; and (h) cutting a hole through that circular portion of the main pipe liner which is defined by the annular end face of said third portion of the protective means by means of a boring robot.

12. The method as claimed in claim 11, wherein the step (b) is conducted after the step (e).

13. A pipe lining method as claimed in claim 12, wherein: said boring robot is remote-controlled from the ground, while being watched through a first TV camera stationed in the branch pipe and a second TV camera stationed in the main pipe.

14. A pipe lining method as claimed in claim 12, wherein: said boring robot has a spin grinder means which is capable of shifting vertically and has a diameter smaller than the inner diameter of the annular end of said third portion of the protective means, and whose upper and lower faces are abrasive.

15. A pipe lining method as claimed in claim 12, wherein: said boring robot has a conical spin grinder means which is capable of shifting vertically and has a maximum diameter similar to or greater than the inner diameter of the annular end of said third portion of the protective means.

16. A pipe lining method as claimed in claim 11, wherein:

said boring robot is remote-controlled from the ground, while being watched through a first TV camera stationed in the branch pipe and a second TV camera stationed in the main pipe.

17. A pipe lining method as claimed in claim 11, wherein:

said boring robot has a spin grinder means which is capable of shifting vertically and has a diameter smaller than the inner diameter of the annular end of said third portion of the protective means, and whose upper and lower faces are abrasive.

18. A pipe lining method as claimed in claim 11, wherein:

said boring robot has a conical spin grinder means which is capable of shifting vertically and has a maximum diameter similar to or greater than the inner diameter of the annular end of said third portion of the protective means.

\* \* \* \* \*